US011248632B2

United States Patent
Perry

(10) Patent No.: US 11,248,632 B2
(45) Date of Patent: Feb. 15, 2022

(54) BLADDER ASSEMBLY AND ASSOCIATED BORE ALIGNMENT SYSTEM AND METHOD

(71) Applicant: The Boeing Company, Chicago, IL (US)

(72) Inventor: Steven R. Perry, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 74 days.

(21) Appl. No.: 16/599,315

(22) Filed: Oct. 11, 2019

(65) Prior Publication Data
US 2020/0040918 A1   Feb. 6, 2020

Related U.S. Application Data

(62) Division of application No. 15/132,828, filed on Apr. 19, 2016, now Pat. No. 10,480,544.

(51) Int. Cl.
*B64F 5/10* (2017.01)
*B23P 19/10* (2006.01)
(Continued)

(52) U.S. Cl.
CPC ............. *F15B 15/10* (2013.01); *B23P 19/10* (2013.01); *B32B 1/08* (2013.01); *B32B 5/024* (2013.01);
(Continued)

(58) Field of Classification Search
CPC .. F15B 15/10; B64B 5/10; B23P 19/10; B23P 2700/01; B32B 27/08; B32B 7/08; B32B 25/14; B32B 27/14; B32B 25/12; B32B 25/18; B32B 5/26; B32B 1/08; B32B 27/322; B32B 5/024; B32B 7/12;
(Continued)

(56) References Cited

U.S. PATENT DOCUMENTS 8,273,427 B1   9/2012  Steinhour
2003/0005737 A1*  1/2003  Gharib ................. B21D 43/003
                                                                72/58
(Continued)

FOREIGN PATENT DOCUMENTS

CN     203879844    10/2014
EP     0 844 076    5/1998
(Continued)

OTHER PUBLICATIONS

Federal Service for Intellectual Property, Office Action, with English translation, App. No. 2017102987/05(005204) (Jun. 5, 2020).
(Continued)

*Primary Examiner* — Lawrence Averick
(74) *Attorney, Agent, or Firm* — Walters & Wasylyna LLC

(57) ABSTRACT

A bladder assembly including an inflatable bladder having an elongated body defining an internal volume, the body being formed as a layered structure that includes an elastomeric layer defining an interior surface of the body, a friction-reducing layer defining an exterior surface of the body, and a jacketing layer positioned between the elastomeric layer and the friction-reducing layer, and a pressurized fluid source in selective fluid communication with the internal volume of the body.

20 Claims, 8 Drawing Sheets

(51) Int. Cl.
| | |
|---|---|
| *B32B 27/32* | (2006.01) |
| *F15B 15/10* | (2006.01) |
| *B32B 27/08* | (2006.01) |
| *B32B 7/08* | (2019.01) |
| *B32B 25/14* | (2006.01) |
| *B32B 27/12* | (2006.01) |
| *B32B 25/12* | (2006.01) |
| *B32B 25/18* | (2006.01) |
| *B32B 5/26* | (2006.01) |
| *B32B 1/08* | (2006.01) |
| *B32B 5/02* | (2006.01) |
| *B32B 7/12* | (2006.01) |
| *B32B 25/08* | (2006.01) |
| *B32B 25/10* | (2006.01) |
| *F16B 19/02* | (2006.01) |

(52) U.S. Cl.
CPC ............... *B32B 5/26* (2013.01); *B32B 7/08* (2013.01); *B32B 7/12* (2013.01); *B32B 25/08* (2013.01); *B32B 25/10* (2013.01); *B32B 25/12* (2013.01); *B32B 25/14* (2013.01); *B32B 25/18* (2013.01); *B32B 27/08* (2013.01); *B32B 27/12* (2013.01); *B32B 27/322* (2013.01); *B64F 5/10* (2017.01); *B23P 2700/01* (2013.01); *B32B 2262/0253* (2013.01); *B32B 2262/0261* (2013.01); *B32B 2262/0269* (2013.01); *B32B 2307/50* (2013.01); *B32B 2307/546* (2013.01); *B32B 2597/00* (2013.01); *F16B 19/02* (2013.01)

(58) Field of Classification Search
CPC . B32B 25/08; B32B 25/10; B32B 2269/0269; B32B 2262/0261; B32B 2307/546; B32B 2262/0253; B32B 2597/00; B32B 2307/50; B32B 2250/24; B32B 2262/0223; B32B 2262/0246; F16B 19/02
See application file for complete search history.

(56) References Cited

U.S. PATENT DOCUMENTS

| | | | |
|---|---|---|---|
| 2004/0091378 A1* | 5/2004 | McCall | F04B 43/084 417/472 |
| 2009/0301715 A1* | 12/2009 | Corre | E21B 49/10 166/250.17 |
| 2011/0210112 A1* | 9/2011 | Boatner, Jr. | B23K 9/0354 219/158 |
| 2014/0130566 A1* | 5/2014 | Schafer | B21D 39/203 72/372 |

FOREIGN PATENT DOCUMENTS

| | | |
|---|---|---|
| JP | H01115530 | 5/1989 |
| JP | H9-182992 | 7/1997 |

OTHER PUBLICATIONS

Federal Service for Intellectual Property, Office Action, with English translation, App. No. 2017102987/05(005204) (Nov. 5, 2020).
Japan Patent Office, Office Action, with English translation, App. No. 2017-078896 (Dec. 22, 2020).
China National Intellectual Property Administration, Office Action, with English translation, App. No. 201710177099.6 (Jun. 5, 2020).

* cited by examiner

BLADDER ASSEMBLY AND ASSOCIATED BORE ALIGNMENT SYSTEM AND METHOD

PRIORITY

This application is a divisional of U.S. Ser. No. 15/132,828 filed on Apr. 19, 2016.

FIELD

This application relates to bore alignment and, more particularly, to the use of an inflatable bladder to effect alignment of two or more bores.

BACKGROUND

Mechanical fasteners, such as pins, rivets, bolts and the like, have long been used to connect one member to one or more other members. In a typical example, a first bore formed in a first member is aligned with a second bore formed in a second member. Then, a mechanical fastener (e.g., a pin) is inserted through both bores, thereby inhibiting displacement of the first member relative to the second member. A securement feature, such as a nut or a cotter pin, may engage the mechanical fastener to inhibit unintentional removal of the mechanical fastener from the bores.

Various aircraft components are connected together with mechanical fasteners. For example, the wings of an aircraft may be secured to the fuselage with mechanical fasteners, such as bolts. Unfortunately, as the size of the components being connected together increases, it often becomes more difficult, time-consuming and expensive to align the bores that will receive the mechanical fasteners.

Tapered alignment pins have been used to align bores prior to insertion of a mechanical fastener. Specifically, tapered alignment pins are thrust (e.g., hammered), often with relatively high force, into misaligned bores to effect alignment. However, the thrusting process can be time consuming and can wear off the surface finish on the components being connected together.

Accordingly, those skilled in the art continue with research and development efforts in the field of bore alignment.

SUMMARY

In one embodiment, the disclosed bladder assembly may include an inflatable bladder having an elongated body defining an internal volume, the body being formed as a layered structure that includes an elastomeric layer defining an interior surface of the body, a friction-reducing layer defining an exterior surface of the body, and a jacketing layer positioned between the elastomeric layer and the friction-reducing layer, and a pressurized fluid source in selective fluid communication with the internal volume of the body.

In one embodiment, the disclosed bore alignment system may include a first member defining a first bore having a first central axis, a second member defining a second bore having a second central axis, wherein the second central axis is displaced from the first central axis, and a bladder assembly including an inflatable bladder extending through both the first bore and the second bore, and a pressurized fluid source in selective fluid communication with the inflatable bladder.

In one embodiment, the disclosed bore alignment method may be used to aligning a first bore in a first member with a second bore in a second member, wherein the method includes steps of (1) positioning an inflatable bladder to extend through both the first bore and the second bore and (2) pressurizing the inflatable bladder with a fluid to cause the inflatable bladder to expand into engagement with the first member and the second member.

Other embodiments of the disclosed bladder assembly and associated bore alignment system and method will become apparent from the following detailed description, the accompanying drawings and the appended claims.

DETAILED DESCRIPTION

Figure 1:
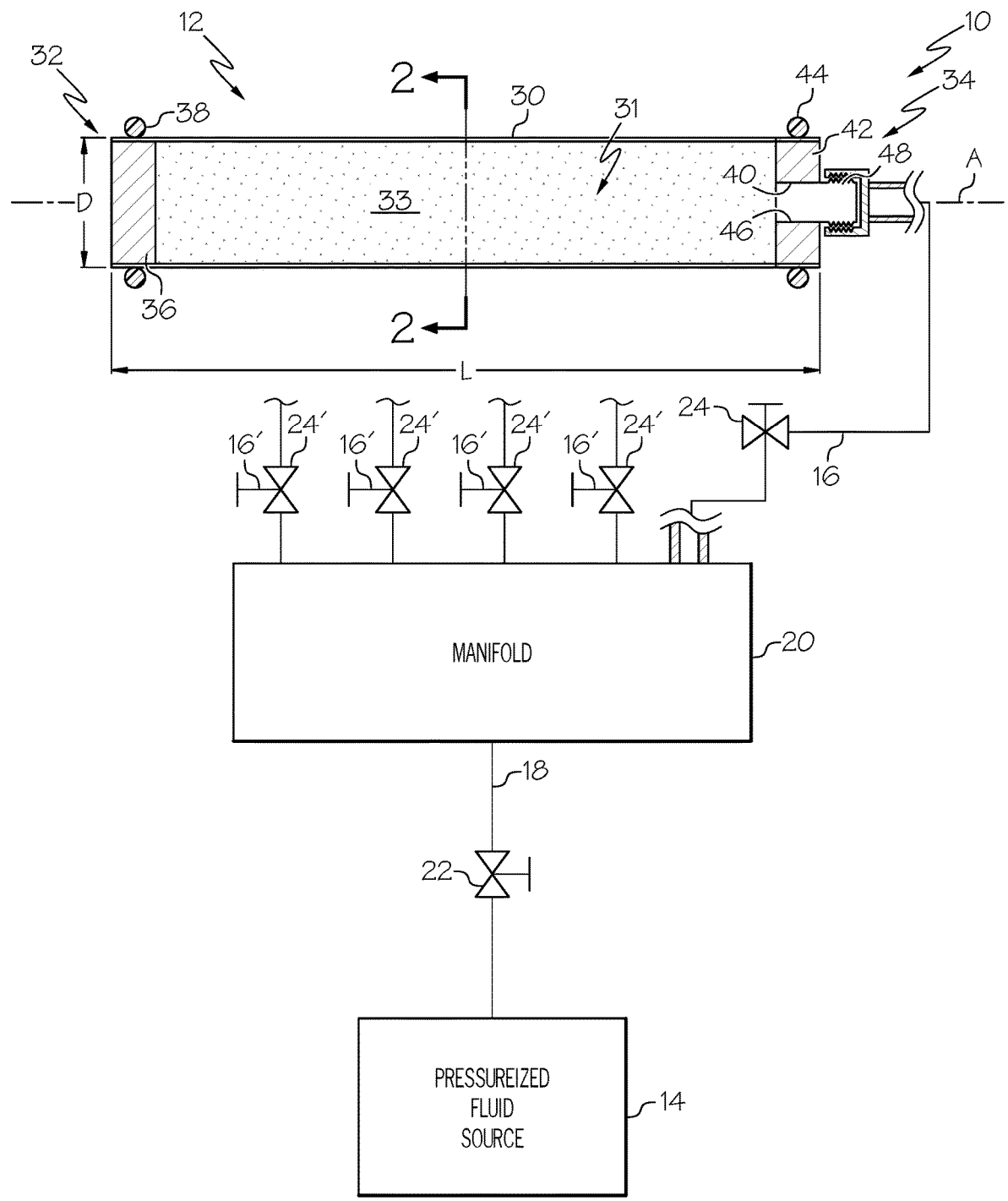
FIG. 1 is a schematic partial cross-sectional view of one embodiment of the disclosed bladder assembly.

Referring to FIG. 1, one embodiment of the disclosed bladder assembly, generally designated 10, may include an inflatable bladder 12 and a pressurized fluid source 14. The inflatable bladder 12 may be in selective fluid communication with the pressurized fluid source 14 by way of one or more fluid lines 16, 18. The bladder assembly 10 may optionally further include a manifold 20 and one or more valves 22, 24 to control the flow of fluid through the fluid lines 16, 18. Various additional components and features may be included in the bladder assembly 10 without departing from the scope of the present disclosure.

The inflatable bladder 12 may include a body 30 that is elongated along a longitudinal axis A, and that defines an internal volume 31. Therefore, the body 30 of the inflatable bladder 12 may have a maximum length L and a maximum transverse dimension (e.g., a diameter D) when the internal volume 31 of the body 30 is pressurized with a fluid 33 from the pressurized fluid source 14. The maximum length L and the diameter D of the body 30 of the inflatable bladder 12 may be dictated by the intended application of the inflatable bladder 12, such as the dimensions of the particular system 100 (FIG. 3) in which the inflatable bladder 12 is implemented, among other possible factors.

The body 30 of the inflatable bladder 12 may include a first end portion 32 and a second end portion 34 longitudinally opposed from the first end portion 32. The first end portion 32 of the body 30 may be sealed. Various techniques may be used to seal the first end portion 32 of the body 30. For example, as shown in FIG. 1, a first end fitting 36 may be sealingly connected to the first end portion 32 of the body 30, such as by bonding (e.g., with adhesives or ultrasonic welding) or mechanically (e.g., with a ring clamp 38, as shown in FIG. 1).

The second end portion 34 of the body 30 of the inflatable bladder 12 may also be sealed, but may define a fluid port 40 in fluid communication with the internal volume 31 of the body 30. Various techniques may be used to seal the second end portion 34 of the body 30, while still providing fluid communication with the internal volume 31 of the body 30. For example, as shown in FIG. 1, a second end fitting 42 may be sealingly connected to the second end portion 34 of the body 30, such as by bonding (e.g., with adhesives or ultrasonic welding) or mechanically (e.g., with a ring clamp 44, as shown in FIG. 1). The second end fitting 42 may define a bore 46 that may function as the fluid port 40. The second end fitting 42 may include a threaded nipple 48 or the like to facilitate coupling the fluid line 16 to the second end fitting 42, thereby facilitating fluid communication between the pressurized fluid source 14 and the internal volume 31 of the body 30 of the inflatable bladder 12.

The body 30 of the inflatable bladder 12 may be flexible and, thus, expandable/collapsible depending on whether the body 30 is pressurized. The body 30 of the inflatable bladder 12 may also be fluid tight or at least substantially fluid tight (e.g., some insubstantial weeping may be permitted). Furthermore, the body 30 of the inflatable bladder 12 may be capable of withstanding, without rupturing, pressurization of the internal volume 31 to the required operating pressures.

Compositionally, various materials (including combinations of materials) may be used to form the body 30 of the inflatable bladder 12. As one example, the body 30 of the inflatable bladder 12 may be formed from (or may include) an elastomeric material, such a rubber (e.g., natural and/or synthetic rubber). As another example, the body 30 of the inflatable bladder 12 may be formed as a jacketed hose (similar to a jacketed fire hose) that includes a textile jacket received over an elastomeric core.

Figure 2:
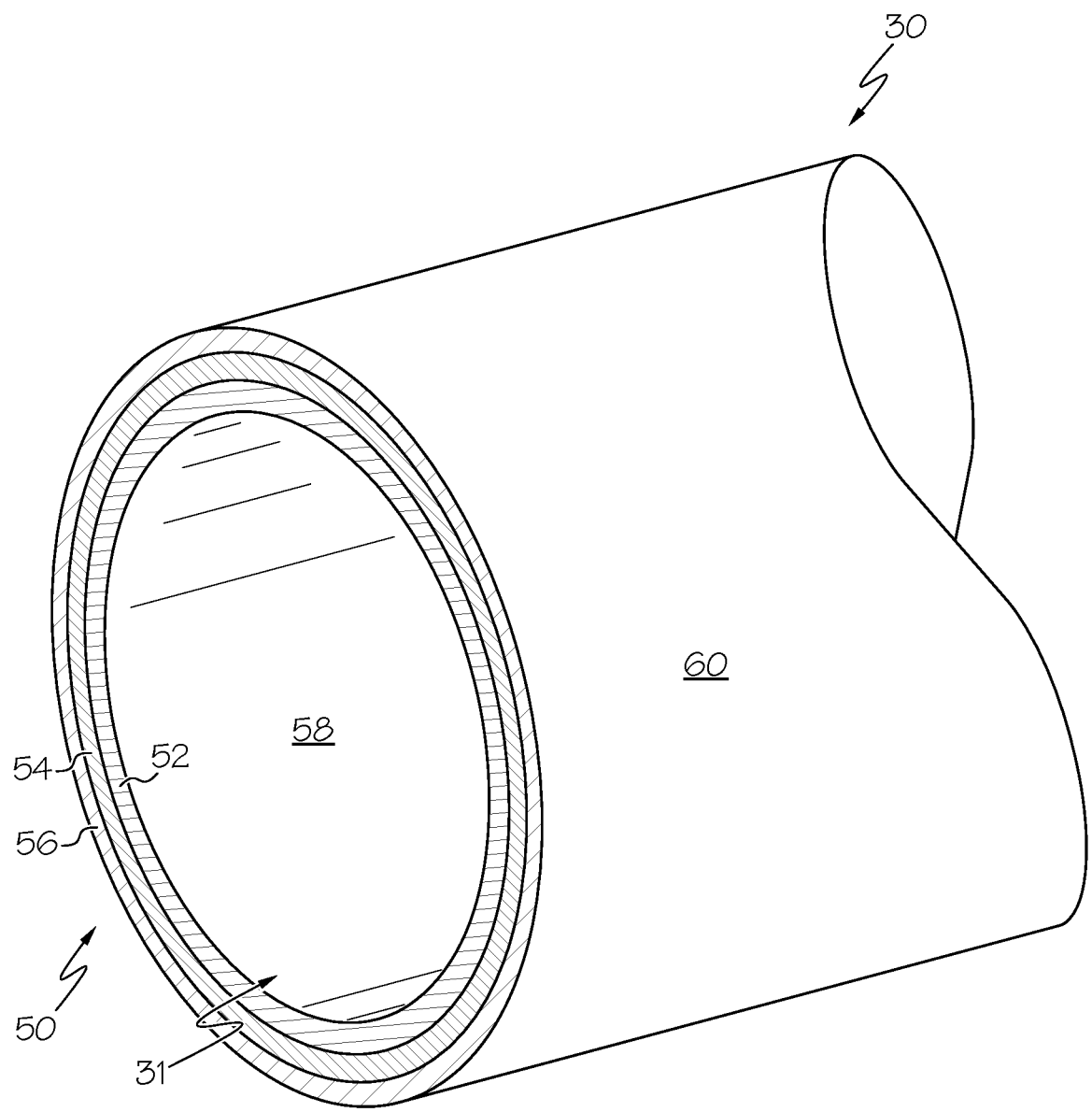
FIG. 2 is a detailed cross-sectional view of a portion of the bladder assembly of FIG. 1.

Referring to FIG. 2, in one particular construction, the body 30 of the inflatable bladder 12 (FIG. 1) may have a layered structure 50 that includes an elastomeric layer 52, a jacketing layer 54 and a friction-reducing layer 56. The elastomeric layer 52 may form the interior surface 58 of the body 30 and the friction-reducing layer 56 may form the exterior surface 60 of the body 30. The jacketing layer 54 may be positioned between the elastomeric layer 52 and the friction-reducing layer 56. Additional layers, such as additional elastomeric layers, additional jacketing layers and/or additional friction-reducing layer 56 may be included in the layered structure 50 without departing from the scope of the present disclosure.

The elastomeric layer 52 of the layered structure 50 of the body 30 may function to contain fluid 33 (FIG. 1) within the internal volume 31 of the body 30. The elastomeric layer 52 may be formed from (or may include) an elastomeric material or a combination of elastomeric materials. Therefore, the elastomeric layer 52 may expand as the internal volume 31 of the body 30 is pressurized by fluid 33 and may contract as the as the internal volume 31 of the body 30 is depressurized.

Various elastomeric materials may be used to form the elastomeric layer 52 of the layered structure 50 of the body 30. As one specific, non-limiting example, the elastomeric layer 52 may be formed from (or may include) natural rubber. As another specific, non-limiting example, the elastomeric layer 52 may be formed from (or may include) a synthetic rubber (e.g., polybutadiene rubber, nitrile rubber, etc.).

The jacketing layer 54 of the layered structure 50 of the body 30 may provide strength that resists pressure-induced expansion of the underlying elastomeric layer 52 beyond the confines of the jacketing layer 54. Therefore, pressure-induced expansion of the elastomeric layer 52 may be limited by the dimensions (e.g., the maximum diameter) of the jacketing layer 54.

Because of the pressures involved, the jacketing layer 54 of the layered structure 50 of the body 30 may be formed from ballistic fibers. The ballistic fibers may be configured as a fabric (e.g., a woven fabric), a mesh or the like. As one specific, non-limiting example, the jacketing layer 54 may be formed from (or may include) KEVLAR® para-aramid synthetic fabric, commercially available from E. I. du Pont de Nemours and Company of Wilmington, Del. As another specific, non-limiting example, the jacketing layer 54 may be formed from (or may include) SPECTRA® ultra-high-molecular-weight polyethylene fiber fabric commercially available from Honeywell Advanced Fibers and Composites of Colonial Heights, Va. As another specific, non-limiting example, the jacketing layer 54 may be formed from (or may include) DYNEEMA® ultra-high-molecular-weight polyethylene fiber fabric commercially available from DSM High Performance Fibers B.V. of the Netherlands. As yet another specific, non-limiting example, the jacketing layer 54 may be formed from (or may include) ballistic nylon.

The friction-reducing layer 56 of the layered structure 50 of the body 30 may form the exterior surface 60 of the body 30. Therefore, the friction-reducing layer 56 may reduce friction forces between the body 30 and surrounding structure (bore walls and edges) as the body 30 is inflated.

The friction-reducing layer 56 of the layered structure 50 of the body 30 may be formed from polytetrafluoroethylene (PTFE) or may include polytetrafluoroethylene (e.g., may be formed from polytetrafluoroethylene-coated materials). The use of polymeric materials other than polytetrafluoroethylene, which exhibit a coefficient of friction of at most about 0.10, is also contemplated. As one specific, non-limiting example, the friction-reducing layer 56 may be a woven fabric formed from (or including) polytetrafluoroethylene. As another specific, non-limiting example, the friction-reducing layer 56 may be a sheet (e.g., a membrane or film) formed from (or including) polytetrafluoroethylene.

Referring back to FIG. 1, the fluid 33 is supplied to the inflatable bladder 12 from the pressurized fluid source 14 by way of fluid lines 16, 18. In one expression, the fluid 33 may be a gas, such as compressed air, nitrogen or the like, and the pressurized fluid source 14 may be (or may include) a compressor. In another expression, the fluid 33 may be a liquid, such as water, hydraulic fluid or the like, and the pressurized fluid source 14 may be (or may include) a pump, such as a gear pump, a screw pump or the like.

A manifold 20 may optionally be disposed between the pressurized fluid source 14 and the inflatable bladder 12. The manifold 20 may receive fluid 33 from the pressurized fluid source 14 by way of fluid line 18 (and valve 22), and may distribute the fluid 33 to multiple inflatable bladders 12 (only one inflatable bladder 12 is shown in FIG. 1) by way of fluid lines 16, 16' (and valves 24, 24').

Figure 3:
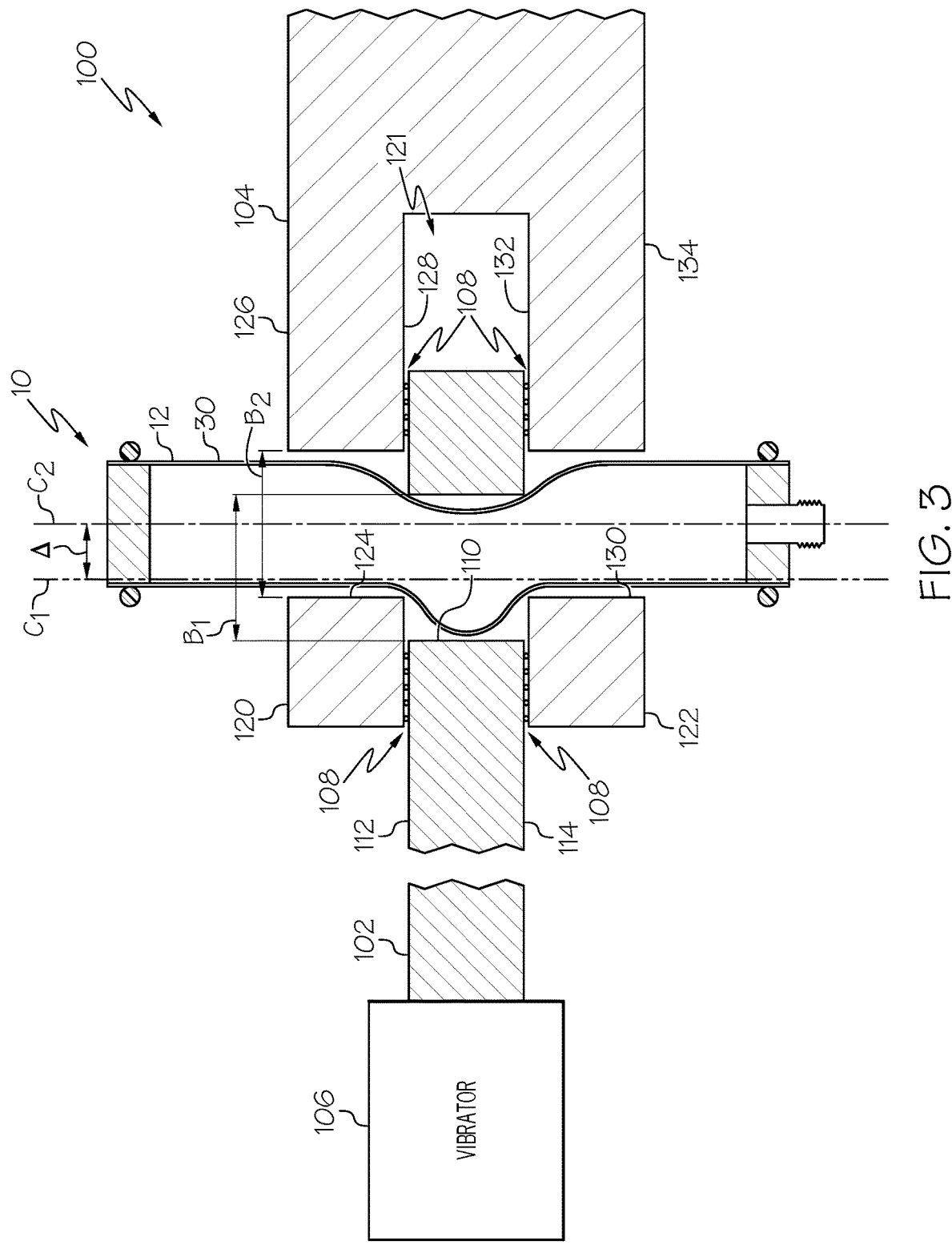
FIG. 3 is a side elevational view, in section, of one embodiment of the disclosed bore alignment system, shown with the bores in a misaligned configuration.

Referring now to FIG. 3, one embodiment of the disclosed bore alignment system, generally designated 100, may include a first member 102, a second member 104 and a bladder assembly 10 (only the inflatable bladder 12 of the bladder assembly 10 is shown in FIG. 3; see FIG. 1 for the entire bladder assembly 10). The bore alignment system 100 may optionally further include a vibrator 106 and/or a lubricant 108.

Various members may be aligned using the disclosed bore alignment system 100. In one particular implementation, the first and second members 102, 104 of the bore alignment system 100 may be structural members, such as structural components of an aircraft. In another particular implementation, the first and second members 102, 104 of the bore alignment system 100 may be adjacent fuselage sections of an aircraft. In yet another particular implementation, the first and second members 102, 104 of the bore alignment system 100 may be pipe sections. Therefore, the disclosed bore alignment system 100 has broad application, and variations in the structure and function of the first and second members 102, 104 will not result in a departure from the scope of the present disclosure.

The first member 102 of the bore alignment system 100 may define a first bore 110, which may extend through the first member 102 from a first surface 112 of the first member 102 to a second surface 114 of the first member 102. The first bore 110 may have a first bore diameter $B_1$, and may define a first central axis $C_1$.

The second member 104 of the bore alignment system 100 may be a clevis or the like and, therefore, may include a first extension member 120 and a second extension member 122. The first extension member 120 may be spaced apart from the second extension member 122 to define a gap 121 therebetween. The gap 121 may be sized to receive therein the first member 102, as shown in FIG. 3.

The first extension member 120 of the second member 104 may define a second bore 124, which may extend through the first extension member 120 from a first surface 126 of the first extension member 120 to a second surface 128 of the first extension member 120. The second bore 124 may have a second bore diameter $B_2$, and may define a second central axis $C_2$. The second bore diameter $B_2$ may closely correspond to the first bore diameter $B_1$ (e.g., the second bore diameter $B_2$ may be substantially equal to the first bore diameter $B_1$).

The second extension member 122 of the second member 104 may define a third bore 130, which may extend through the second extension member 122 from a first surface 132 of the second extension member 122 to a second surface 134 of the second extension member 122. The third bore 130 may have the same diameter (second bore diameter $B_2$) as the second bore 124, and may be aligned with the second bore 124 along the second central axis $C_2$.

As shown in FIG. 3, the first bore 110 of the first member 102 may be misaligned with the second and third bores 124, 130 of the second member 104. Specifically, the first central axis $C_1$ of the first bore 110 may be laterally displaced a distance $\Delta$ from the second central axis $C_2$ of the second and third bores 124, 130. The displacement distance $\Delta$ may be less than the bore diameter $B_2$ of the second bore 124.

Figure 4:
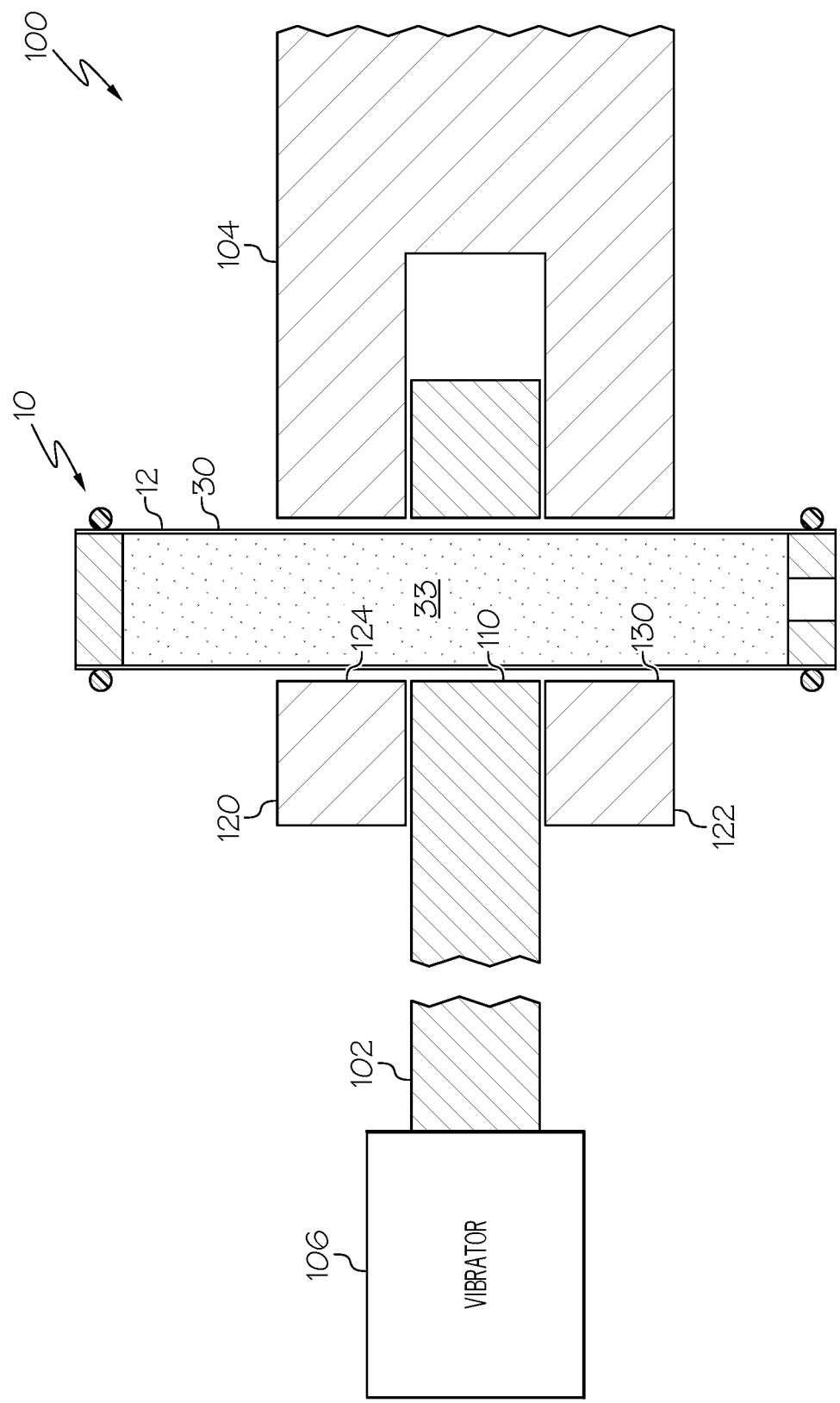
FIG. 4 is a side elevational view, in section, of the bore alignment system of FIG. 3, but shown with the bores in an aligned configuration.

To effect alignment of the first bore 110 with the second and third bores 124, 130, the inflatable bladder 12 may be positioned, while in a deflated/unpressurized state, such that the body 30 of the inflatable bladder 12 extends through the first bore 110 and at least one of the second and third bores 124, 130. Then, as shown in FIG. 4, fluid 33 from the pressurized fluid source 14 (FIG. 1) may be supplied to the inflatable bladder 12, thereby causing inflation and expansion of the inflatable bladder 12 within the bores 110, 124, 130. This inflation and expansion of the inflatable bladder 12 within the bores 110, 124, 130 may cause the first member 102 to move relative to the second member 104 until the bores 110, 124, 130 are aligned (e.g., the displacement distance $\Delta$ (FIG. 1) is reduced to approximately zero).

At this point, it should be appreciated that using an inflatable bladder 12 having a body 30 that includes a friction-reducing layer 56 defining the exterior surface 60 of the body 30 may reduce friction forces between the inflatable bladder 12 and the first and second members 102, 104. Without being limited to any particular theory, it is believed that the reduction of friction forces achieved by introducing the friction-reducing layer 56 promotes the development of even tension along the exterior surface 60 of the body 30 when the inflatable bladder 12 is pressured, thereby developing forces within the members that act to promote motion aligning of the bores 110, 124, 130.

Resistance to alignment of the bores 110, 124, 130 may occur due to friction between the first member 102 and the second member 104. Therefore, in one optional variation, the vibrator 106 (or plural vibrators 106 (not shown)) may be coupled with the first member 102, the second member 104 or both the first member 102 and the second member 104. The vibrator 106 may be actuated during and/or after the inflation/expansion of the inflatable bladder 12 to supply vibration to the first member 102 and/or the second member 104, thereby reducing friction therebetween and, as such, promoting alignment of the bores 110, 124, 130. Vibration reduces the net friction in three ways: (1) by imparting small random relative motions (momentum of one member relative to another) such that normal force between surfaces are temporarily overcome along with the coupled tangential friction force that inhibits motion; (2) by imparting relative motion such that where friction still exists, it exists at the proportionally lower dynamic friction coefficient; and (3) by physically displacing the part in the alignment direction. A combination of the above factors may improve the alignment capability of the bladder system because it effectively eliminates all friction forces in the system until alignment is achieved. The vibration frequency may be selected based on, among other possible factors, the weight and size of the first member 102 and the second member (e.g., lower frequency for larger members and high frequency for smaller members).

In another optional variation, lubricant 108 (FIG. 3) may be positioned between the first member 102 and the second member 104 prior to inflation/expansion of the inflatable bladder 12. The lubricant 108 may be a grease, an oil or the like, and may reduce friction between the first member 102 and the second member 104 during inflation/expansion of the inflatable bladder 12.

In yet another optional variation, the pressure supplied by the pressurized fluid source 14 may be varied over time (rather than constant). For example, the pressure supplied by the pressurized fluid source 14 may alternate between relatively high pressure (surge pressure) and relatively low pressure.

Figure 5:
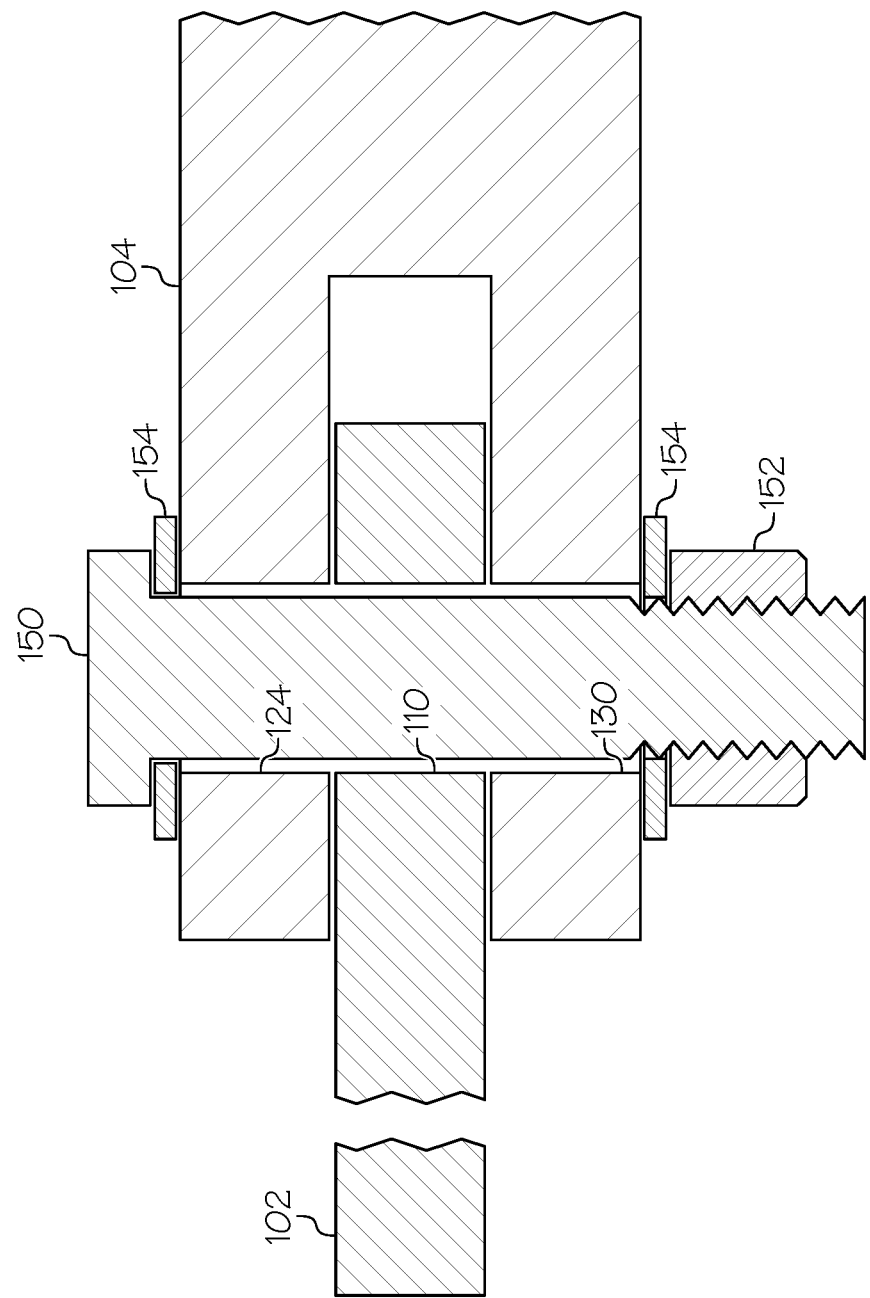
FIG. 5 is a side elevational view, in section, of the bore alignment system of FIG. 4, but shown with a mechanical fastener extending through the aligned bores.

Referring now to FIG. 5, once the first bore 110 has been aligned with the second and third bores 124, 130, the inflatable bladder 12 may be deflated and removed from the bores 110, 124, 130 such that a mechanical fastener 150 may be inserted through the bores 110, 124, 130. Various mechanical fasteners 150 may be used without departing from the scope of the present disclosure. Non-limiting examples of suitable mechanical fasteners 150 include pins, rivets and bolts. A securement feature 152, such as nut, cotter pin or the like, may secure the mechanical fastener 150 relative to the first and second members 102, 104. Optional washers 154 may also be used.

Figure 6:
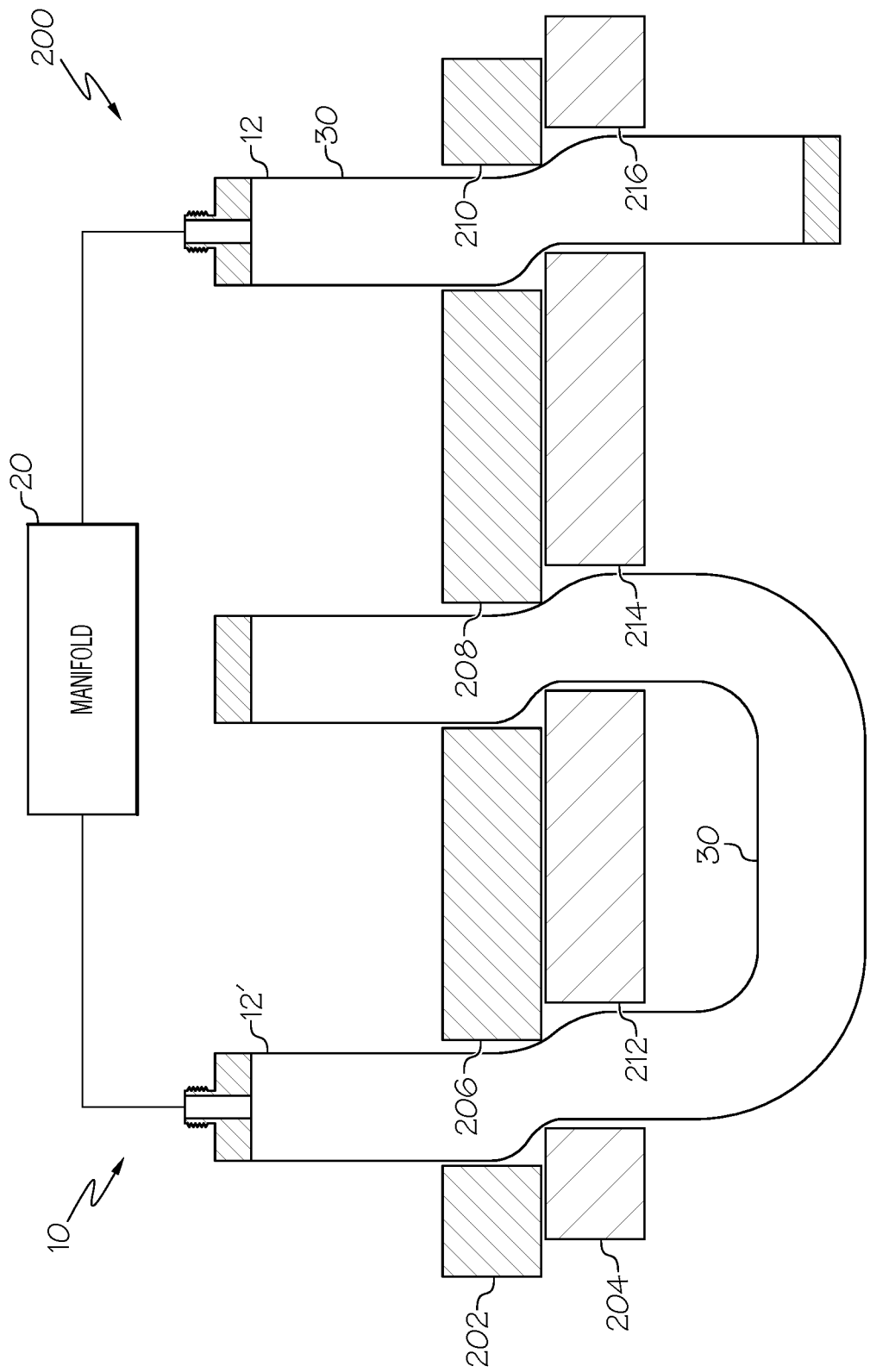
FIG. 6 is a side elevational view, in section, of another embodiment of the disclosed bore alignment system, shown with the bores in a misaligned configuration.

Referring now to FIG. 6, another embodiment of the disclosed bore alignment system, generally designated 200, may include a first member 202, a second member 204 and a bladder assembly 10 having plural inflatable bladders 12, 12' (only the inflatable bladders 12, 12' and the manifold 20 are shown in FIG. 6; see FIG. 1 for the entire bladder assembly 10). The first member 202 of the bore alignment system 200 may define plural bores 206, 208, 210 and the second member 204 may define corresponding plural bores 212, 214, 216.

To effect alignment, the first inflatable bladder 12 may be positioned, while in a deflated/unpressurized state, such that the body 30 of the first inflatable bladder 12 extends through bore 210 of the first member 202 and bore 216 of the second member 204. The second inflatable bladder 12' may be positioned, while in a deflated/unpressurized state, such that the body 30 of the second inflatable bladder 12' extends through bore 206 of the first member 202 and bore 212 of the second member 204, and then through bore 208 of the first member 202 and bore 214 of the second member 204. The inflatable bladders 12, 12' may then be pressurized to achieve alignment.

Accordingly, the disclosed bore alignment systems 100, 200 may be used in various ways to align misaligned bores. The length L (FIG. 1) and diameter D (FIG. 1) of the inflatable bladder 12, as well as the type of fluid 33 (FIG. 1) used to pressurize the inflatable bladder 12, may depend on the particular application, including the size and shape of the bores being aligned.

Figure 7:
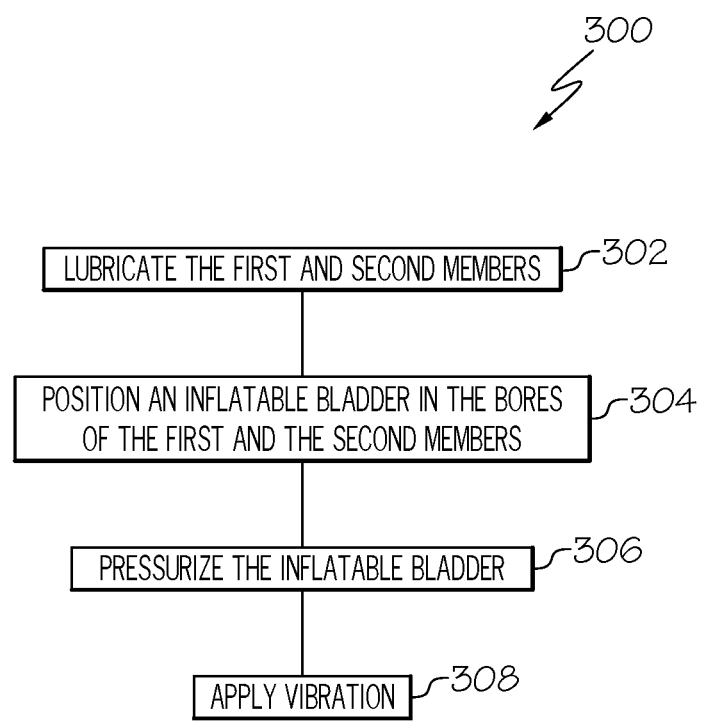
FIG. 7 is a flow diagram depicting one embodiment of the disclosed bore alignment method.

Also disclosed is a bore alignment method. Referring to FIG. 7, one embodiment of the disclosed bore alignment method, generally designated 300, may be used to align a first bore in a first member with a second bore in a second member. The method 300 may begin at Block 302 with the step of positioning a lubricant between the first member and the second member. The lubricant may be an oil, a grease or the like, and may reduce friction between the first member and the second member.

At Block 304, an inflatable bladder may be positioned to extend through both the first bore and the second bore. The inflatable bladder may be in a deflated/unpressurized state during the positioning step (Block 304). Therefore, the inflatable bladder can be positioned in the first and the second bores even when the first and the second bores are misaligned.

At Block 306, the inflatable bladder may be pressurized with a fluid. The fluid may be a gas (e.g., compressed air) or a liquid (e.g., hydraulic fluid or water). Pressurization of the inflatable bladder may cause the inflatable bladder to expand into engagement with the first member and the second member, thereby urging into alignment the bores in the first and the second members.

At Block 308, a vibration may be applied to the first member and/or the second member. The frequency of the vibration may depend on the size of the first and the second members. Functionally, the vibration may reduce friction between the first member and the second member, thereby promoting alignment. While the vibration (Block 308) is shown in FIG. 7 being applied after pressurization (Block 306), in one alternative aspect, vibration (Block 308) and pressurization (Block 306) may occur simultaneously. In another alternative aspect, vibration (Block 308) may be applied before pressurization (Block 306).

Optionally, it may be desirable to repeatedly cycle the vibration (Block 308) and the pressurization (Block 306). It is conceivable that friction between the bore surfaces and the bladder may be reduced by cycling pressurization (Block 306) such that the material "reorients" itself on the inside of the bore as it is successively further aligned.

Figure 8:
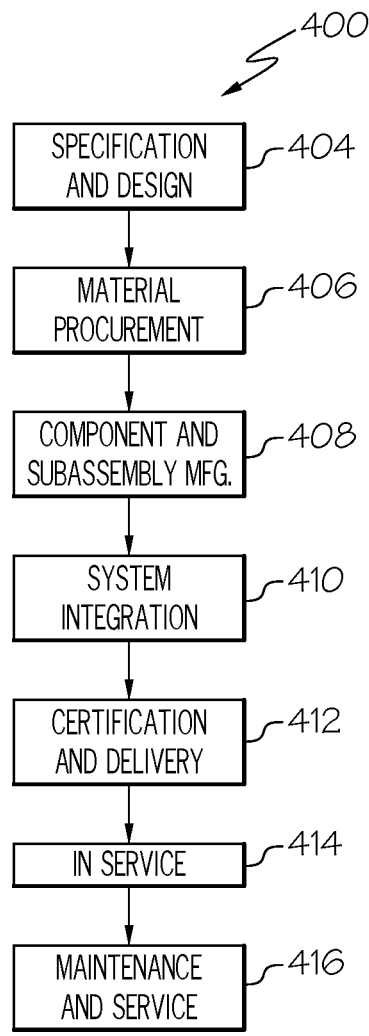
FIG. 8 is a flow diagram of an aircraft manufacturing and service methodology.
Figure 9:
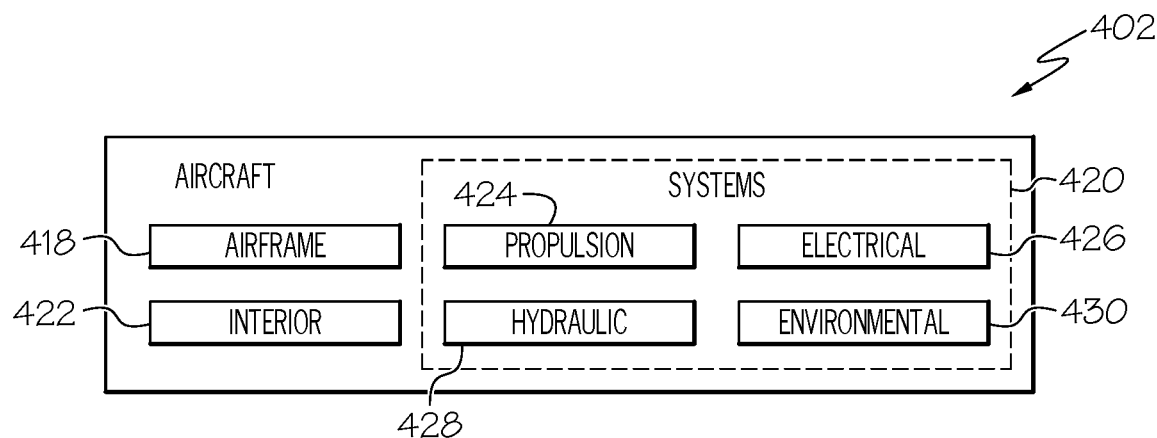
FIG. 9 is a block diagram of an aircraft.

Examples of the disclosure may be described in the context of an aircraft manufacturing and service method 400, as shown in FIG. 8, and an aircraft 402, as shown in FIG. 9. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included.

The disclosed bladder assembly and associated bore alignment system and method may be employed during any one or more of the stages of the aircraft manufacturing and service method 400. As one example, components or subassemblies corresponding to component/subassembly manufacturing 408, system integration 410, and or maintenance and service 416 may be fabricated or manufactured using the disclosed bladder assembly and associated bore alignment system and method. As another example, the airframe 418 and the interior 422 may be constructed using the disclosed bladder assembly and associated bore alignment system and method. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed bladder assembly and associated bore alignment system and method are described in the context of aircraft manufacture and service; however, one of ordinary skill in the art will readily recognize that the disclosed bladder assembly and associated bore alignment system and method may be utilized for a variety of applications. For example, the disclosed bladder assembly and associated bore alignment system and method may be implemented in the manufacture/service of various types of vehicle including, e.g., helicopters, passenger ships, automobiles and the like.

Although various embodiments of the disclosed bladder assembly and associated bore alignment system and method have been shown and described, modifications may occur to those skilled in the art upon reading the specification. The present application includes such modifications and is limited only by the scope of the claims.

What is claimed is:

1. A bore alignment system comprising:
 a first member defining a first bore having a first central axis;
 a second member defining a second bore having a second central axis, wherein said second central axis is displaced from and is substantially parallel to said first central axis; and
 a bladder assembly comprising:
  an inflatable bladder extending through both said first bore and said second bore; and
  a pressurized fluid source in selective fluid communication with said inflatable bladder.

2. The bore alignment system of claim 1 wherein said inflatable bladder comprises an elongated body defining an internal volume, said body having a maximum diameter when pressurized, wherein said first bore has a first bore diameter, and wherein said maximum diameter closely corresponds to said first bore diameter.

3. The bore alignment system of claim 2 wherein said elongated body comprises a sealed first end portion and a sealed second end portion opposed from said first end portion.

4. The bore alignment system of claim 3 wherein said sealed second end portion comprises a fluid port.

5. The bore alignment system of claim 2 wherein said body is formed as a layered structure comprising an elastomeric layer defining an interior surface of said body, a friction-reducing layer defining an exterior surface of said body, and a jacketing layer positioned between said elastomeric layer and said friction-reducing layer.

6. The bore alignment system of claim 5 wherein said friction-reducing layer comprises polytetrafluoroethylene.

7. The bore alignment system of claim 5 wherein said friction-reducing layer comprises a woven fabric or a sheet.

8. The bore alignment system of claim 5 wherein said jacketing layer comprises ballistic fibers.

9. The bore alignment system of claim 1 wherein said pressurized fluid source comprises a liquid.

10. The bore alignment system of claim 1 wherein said pressurized fluid source comprises hydraulic fluid.

11. The bore alignment system of claim 1 further comprising a vibrator positioned to supply vibration to at least one of said first member and said second member.

12. The bore alignment system of claim 1 further comprising a lubricant positioned between said first member and said second member.

13. The bore alignment system of claim 1 wherein said first member is moveable relative to said second member.

14. The bore alignment system of claim 1 wherein a distance that said first central axis of said first bore is displaced from said second central axis of said second bore is reduced when said inflatable bladder is pressurized by said pressurized fluid source.

15. The bore alignment system of claim 14 wherein said distance is reduced to approximately zero.

16. The bore alignment system of claim 1 wherein said first member defines a plurality of first bores and said second member defines a plurality of second bores.

17. The bore alignment system of claim 1 wherein said bladder assembly further comprises a second inflatable bladder.

18. The bore alignment system of claim 17 wherein said second inflatable bladder extends through a third bore in said first member and a fourth bore in said second member.

19. The bore alignment system of claim 17 wherein said second inflatable bladder is in selective fluid communication with said pressurized fluid source.

20. A bore alignment system comprising:
 a first member defining a plurality of first bores, each first bore of said plurality of first bores defining a first central axis;
 a second member defining a plurality of second bores, each second bore of said plurality of second bores defining a second central axis, wherein said second central axes are displaced from said first central axes, and wherein at least one of said first central axes is substantially parallel to at least one of said second central axes; and
 a bladder assembly comprising:
  an inflatable bladder extending through at least two first bores of said plurality of first bores and at least two second bores of said plurality of second bores; and
  a pressurized fluid source in selective fluid communication with said inflatable bladder.

* * * * *